May 14, 1929.  T. H. SYMINGTON  1,712,908
SHOCK ABSORBING BOLSTER
Filed Jan. 25, 1927  5 Sheets-Sheet 3

Patented May 14, 1929.

1,712,908

UNITED STATES PATENT OFFICE.

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND.

SHOCK-ABSORBING BOLSTER.

Application filed January 25, 1927. Serial No. 163,374.

The invention relates to bolsters forming part of railway car trucks.

The principal object of the invention, generally stated, is to provide a truck bolster having shock absorbing mechanism therein acting in series with whatever spring supporting means may be provided for the bolster.

An important object of the invention is to provide a bolster equipped internally with a combination of cushion and friction producing means acting in conjunction with one another and in series with the truck supporting springs, the entire mechanism increasing the spring capacity and avoiding overloading the truck springs.

Another object of the invention is to provide a bolster with internally located cushioning means having considerable travel and acting in series with the bolster supporting springs, the increased travel enabling a truck equipped with the bolster to negotiate out-of-surface track with greater safety than is possible with ordinary equipment.

A more specific object of the invention is to provide a bolster with an internally located cushion and friction mechanism embodying coacting wedge elements movable against spring resistance, the combined action absorbing shocks and jars in addition to increasing the capacity of the truck springs.

A further object of the invention is to provide a truck bolster which is capable of replacing one of standard or conventional design without involving any alterations in the construction of the truck in which it is mounted or of which it forms a part.

Still another object of the invention is the provision of a bolster in which the friction producing means and resilient means opposing movement thereof are all encased or enclosed within the bolster itself and consequently protected against injury and against the ravages of the weather as well as the ingress of dirt and foreign matter.

Another object of the invention is to provide a truck bolster of this type and including these elements and which moreover contemplates the provision of means for initially holding the parts in assembled relation for convenience during shipment or storage and so that disassembly and possible loss of any of the parts will be avoided.

Another specific object of the invention is to provide a bolster of this character having novel means whereby a side bearing structure may be mounted thereon at each side of the axis for cooperation with side bearing elements depending from a body bolster.

Yet another object of the invention is to provide a combined auxiliary spring mechanism and friction producing means in which the auxiliary spring mechanism is supported or mounted in a peculiar manner within the truck bolster itself, the spring elements being restrained against separation or other relative movement in operation.

Another specific object of the invention is to provide a truck bolster embodying horizontally movable wedge elements, and spring means for opposing movement thereof, co-acting with vertically movable wedge elements seated upon and actuated by compression of the truck springs, the combination of forces developed acting to increase the spring capacity, avoid overloading, absorb shocks and jars and in other respects reduce any tendency toward the development of car roll or side sway.

To the attainment of the foregoing and other objects and advantages such as simplicity in construction, ease in assembly, efficiency in operation and durability in service, the invention preferably consists in the detailed construction and the arrangement and combination of parts to be hereinafter more fully described and claimed, and illustrated in the accompanying drawings in which:

Figures 1, 2, 3:
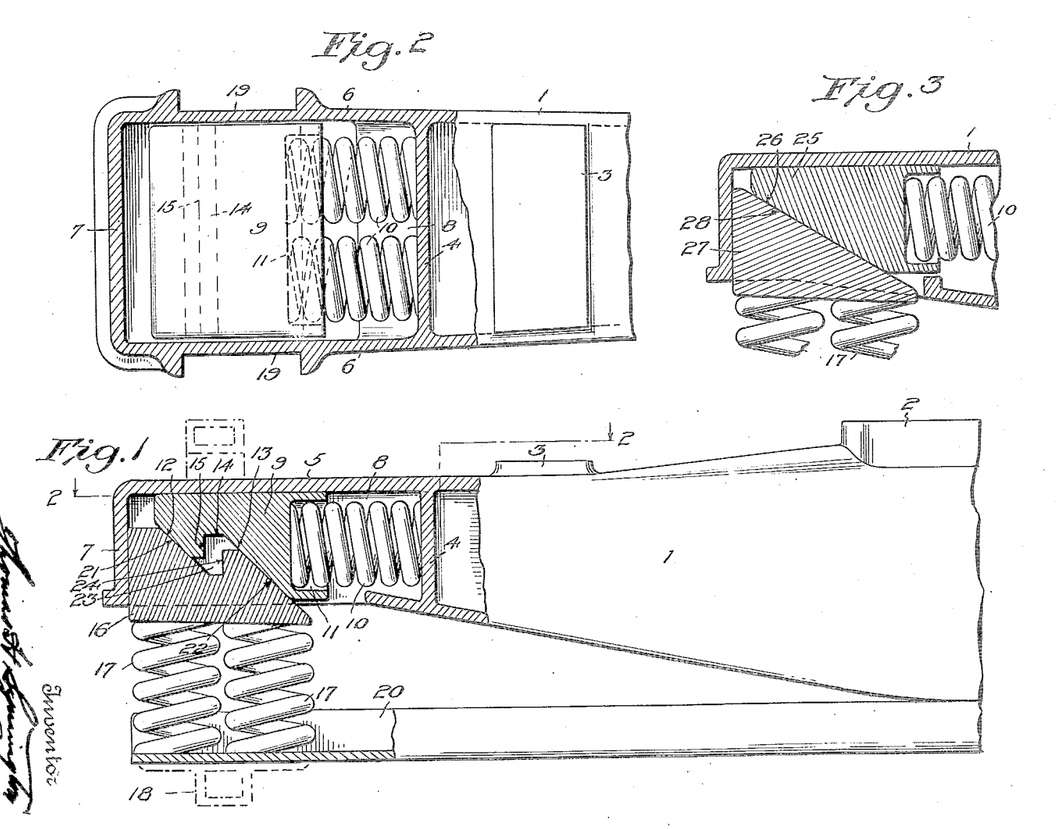
Figure 1 is a view partly in side elevation and partly in vertical longitudinal section showing probably the simplest form of the invention as applied to a truck bolster and associated parts, only one-half the bolster being shown.
Figure 2 is a horizontal cross sectional view taken on the line 2—2 of Figure 1 and looking downwardly.
Figure 3 is a view similar to Figure 1 showing a slight modification.

Referring more particularly to the drawings and especially Figures 1 and 2, the numeral 1 designates, generally, the truck bolster which may be and preferably is of the same general contour and dimensions as those of the conventional or standard pattern. This bolster is represented as having the usual center bearing 2 and side bearing seats 3, only one being shown inasmuch as an illustration and description of one end of the bolster will be entirely adequate to give a full and clear understanding for the reason that both ends are identically the same. At a point spaced inwardly from each end the bolster is formed with a transverse web 4 and from this point each end is preferably reduced in height as shown and, if desired, may be increased in width for the purpose of accommodating the maximum size of friction producing elements to be described. The partition or web 4 cooperates with the top 5, sides 6 and end 7 of the bolster to define a pocket 8 which is open at the bottom.

Located within the pocket 8 and engaging against the top 5 of the bolster is a horizontally movable wedge member 9 urged outwardly or toward the end wall 7 of the bolster as by coil springs 10 which abut at one end against the web or partition 4 and which have their other ends abutting against the wedge member which is preferably recessed or socketed at 11 so as to confine the springs against displacement, the bottom portion of the socket obviously acting as a support for the springs as disclosed in Figure 1. The wedge member 9 is represented as having two preferably parallel inclined surfaces 12 and 13 at its bottom separated by a notched or cut-out portion 14 having a shoulder 15.

Extending into the pocket 8 for cooperation with the wedge member 9 is a combined seat or follower and wedge member 16 which is vertically movable and which rests upon the truck springs 17. Of course each end of the bolster is located within the usual window opening in the truck side frame 18 and the opposite sides of the bolster are provided with the cut-out portions or grooves 19 cooperating with the sides of the window opening for preventing longitudinal displacement of the bolster or movement thereof laterally with respect to the truck. The springs 17 rest upon the usual spring plank 20.

The top of the vertically movable wedge member 16 is formed with two inclined surfaces 21 and 22 which bear against the surfaces 12 and 13 of the upper wedge member 9 and which are separated by a notch or cut-out portion 23 having a shoulder 24 opposed to and adapted, under some circumstances, to engage with the shoulder 15 at the notch or cut-out portion 14 of the upper wedge member 9.

The structure disclosed in Figure 3 is in most respects similar to that illustrated in Figures 1 and 2, the only important difference being that the upper wedge member 25 corresponding to the wedge member 9 has its bottom formed with a single friction or inclined surface 26 and that the lower wedge member 27 has its top provided with a single inclined friction surface 28 engaging and coacting with the surface 26.

In Figures 4 to 8 inclusive I have illustrated another form of the invention which embodies the same principles as those above described and which differs therefrom only in details of construction. Referring to these views, the bolster 29, which is mounted in the truck in the usual manner is formed with a vertical transverse partition wall or web 30 defining a pocket 31 within which is mounted the shock absorbing mechanism. This mechanism includes an upper horizontally movable wedge member 32 and a lower vertically movable wedge member 33 adapted to seat upon the truck springs. These wedge members are represented as of hollow or cored-out construction for the sake of lightness and to save material, though this is an immaterial detail. These wedge members have coacting inclined friction surfaces 34 and 35 respectively, the exact angle of inclination being a matter to be determined by computation or experimentation. The inward movement of the horizontally movable wedge member 32 is opposed by one or more coil springs 36, two being shown in the present instance, which springs abut at one end against the inner end of the wedge member 32 and at the other end against the partition or web 30 which constitutes an abutment.

Figures 4, 5:
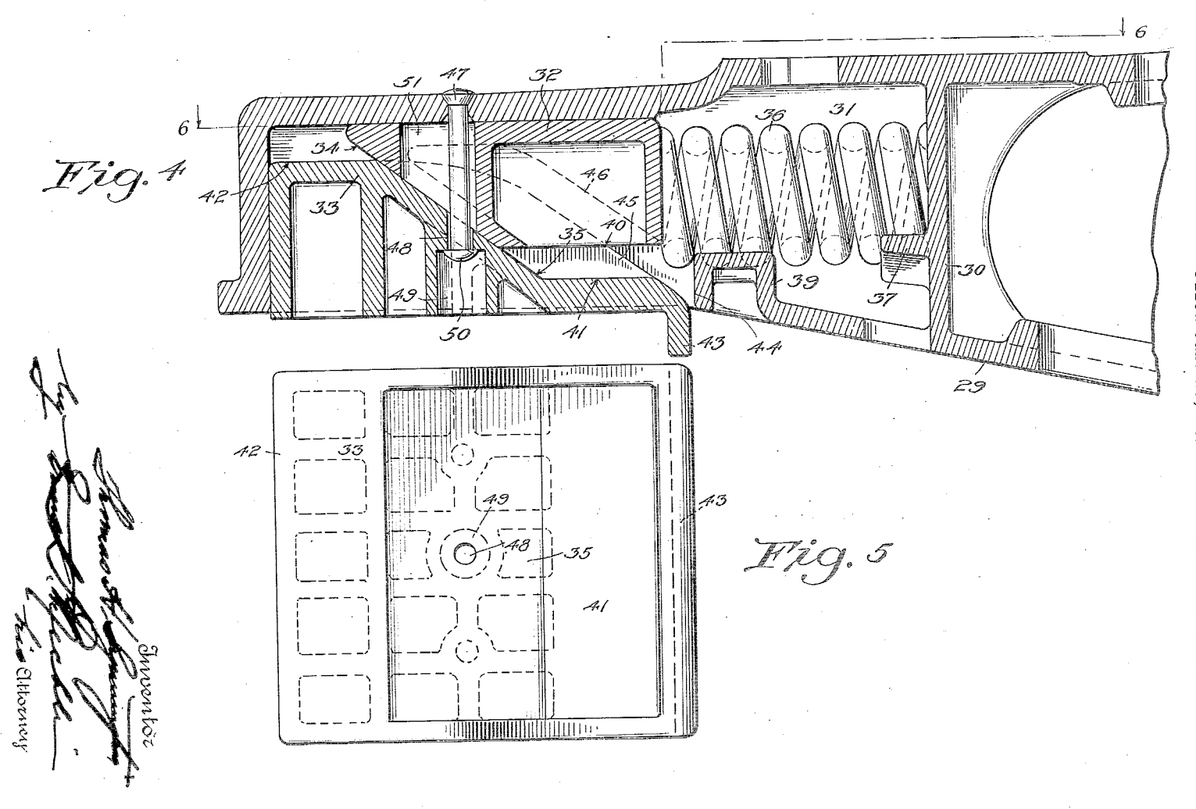
Figure 4 is a view similar to Figure 1 showing a modified form of the invention.
Figure 5 is a plan view of the combined follower and wedge member used in this form.
Figures 6, 7, 8:
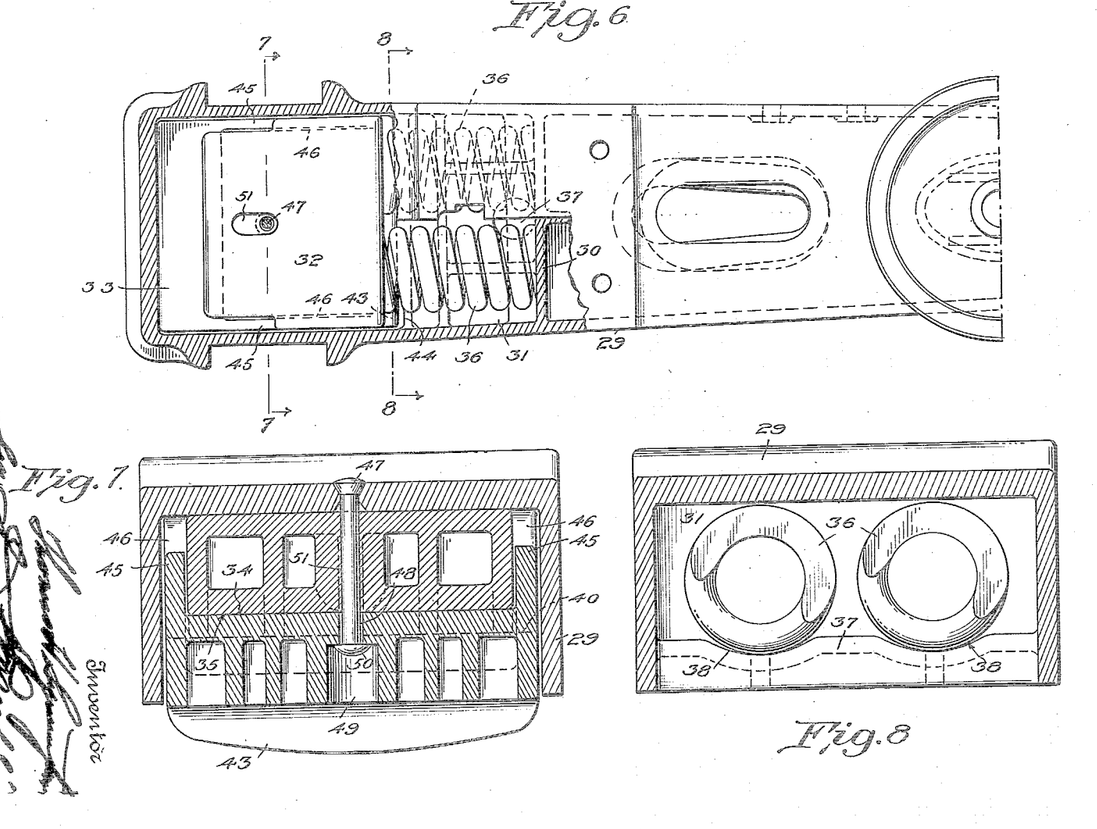
Figure 6 is a horizontal section taken on the line 6—6 of Figure 4.
Figure 7 is a cross sectional view taken on the line 7—7 of Figure 6 looking in the direction of the arrows.
Figure 8 is a cross sectional view taken on the line 8—8 of Figure 6 looking in the direction of the arrows.

While it is conceivable that different means might be provided for maintaining the springs in the proper relation to the wedge members and preventing any displacement, it is convenient to form or provide the web or partition 30 with a ledge 37 dished out or concaved to form saddles 38 within which the springs are seated, and to form the bottom wall of the bolster with an upstanding portion 39 having its top similarly concaved to form seats or saddles for the springs.

Reverting to the wedge members 32 and 33, it will be noted that the former has a horizontal lower edge 40 normally spaced above a corresponding horizontal surface 41 on the latter and that the latter is also provided with a horizontal surface 42 at its highest point. It is preferable that the distances between the edges or surfaces 40 and 41 and the surface 42 and top of the bolster be equal so that when the shock absorbing mechanism goes solid, as might conceivably occur, these various opposed surfaces will come into contact at the same time, thereby distributing the strains and stresses over large areas instead of permitting them to be concentrated at any relatively small localized areas. As an added refinement, the lower wedge member 33 may be formed at its inner edge with a depending lip or flange 43 cooperating with the adjacent wall 44 of the upward extension 39 on the bottom of the bolster, the cooperation of the two effectually guiding the lower wedge member 33 in its movement and confining said movement to the vertical. In the present instance the lower wedge member is shown as having upstanding side flanges 45 between which the upper wedge member 32 is accomodated and the opposite sides of the upper wedge member are recessed or cut away as at 46 to accommodate these flanges.

It is of course desirable that the parts be maintained in assembled relation during shipment or storage and also during handling preliminary to and while installing in a truck. For this reason I may provide a rivet 47 or other equivalent securing element arranged vertically within the bolster and passing through the top wall thereof and through an opening 48 in the inclined wall portion of the lower wedge member 33, this wedge member being socketed or recessed at 49 to accommodate the head 50 of the rivet, bolt or the like during vertical movement of the lower wedge member. Clearly, the upper wedge member 32 must be longitudinally slotted at 51 where the rivet passes through in order that there will be no interference with the longitudinal or horizontal movement.

In Figures 9 to 15 inclusive I have illustrated still another form of the invention which embodies only a modification of the general features above disclosed. Referring to these figures in detail the bolster 52 which has the usual center bearing 53 and reduced end 54 is provided with a vertical web or partition 55 and a horizontal web or partition 56 which coact to define a pocket structure. The horizontal web or wall member is concaved or dished at 57 to provide seats or saddles for a purpose to be described.

Figure 9:
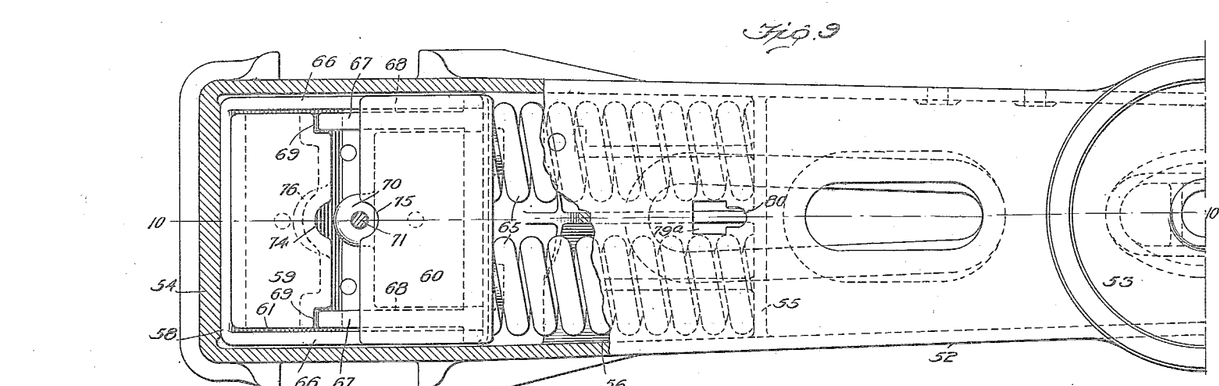
Figure 9 is a view partly in plan and partly in horizontal section showing another modification of the invention.
Figure 10:
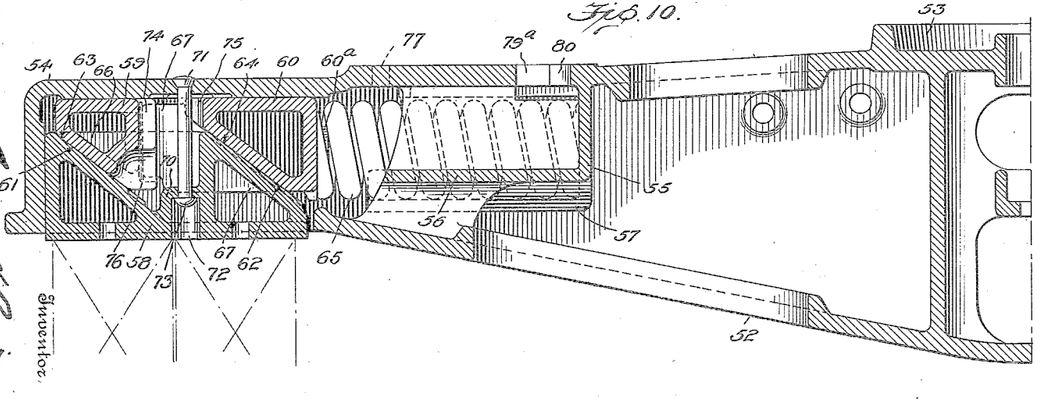
Figure 10 is a longitudinal sectional view taken centrally of the bolster or on the line 10—10 of Figure 9.
Figure 11:
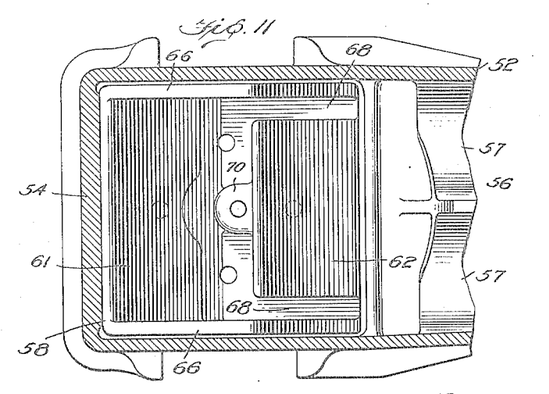
Figure 11 is a horizontal sectional view of the end portion of the bolster only taken on the same line as Figure 9 with the upper wedge members, securing member and springs omitted.

In this embodiment of the invention I provide a combined seat or follower and wedge member 58 mounted for vertical movement within each hollow end portion of the bolster which end portion is of course open at the bottom. Instead of describing the bolster as hollow it may be said to be formed with a pocket, this being a mere choice of terms and not a material matter. Located above and cooperating with the vertically movable wedge member 58 are two separate but simultaneously operable wedge members 59 and 60, the former of which is located outwardly beyond or closer to the end of the bolster than the latter. The lower wedge member 58 has its top formed with two inclined friction surfaces 61 and 62 which engage and coact with the inclined lower friction surfaces 63 and 64 of the wedge members 59 and 60. Inward movement of the wedge members 59 and 60 toward the axis of the bolster is opposed by any desired number of helical or other springs 65 which abut against the inner face of the wedge member 60 and which are held in proper position with respect thereto as by the centering projections 60ª, and against the vertical partition wall 55 of the bolster, these springs lying within the saddles or seats 57.

As stated above the wedge members 59 and 60 are separate but they are intended to operate in unison and for this reason I have disclosed the lower wedge member 58 as formed at its sides with upstanding flanges 66 between which the upper wedge member 59 is accommodated, the inner edges of these flanges terminating flush with or formed as a continuation of the inclined friction surface 62. The upper wedge member 60 is shown as formed or otherwise provided with depending flanges 67 located inwardly of or in spaced relation to the sides thereof and accommodated within openings 68 in the bottom wedge member 58. It will thus be seen that the various wedge members have an interfitting relation especially as the wedge member 59 is formed at its opposite sides with shoulders 69 adapted to abut against the outer ends of the flanges 67. By this arrangement it will be apparent that upon upward movement of the lower wedge member 58 both of the wedge members 59 and 60 will be moved inwardly by direct action though even if the surfaces 62 and 64 did not coact the inward movement of the wedge member 59 would cause corresponding movement of the wedge member 60 by virtue of the abutment of the shoulders 69 on the former with the flanges 67 on the latter.

Figure 12:
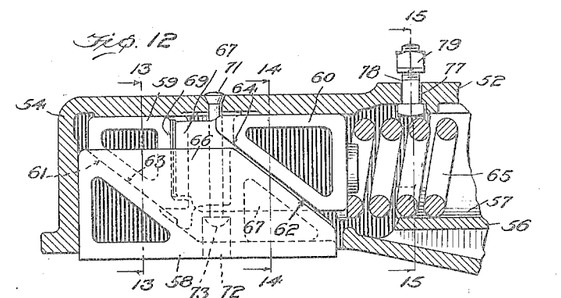
Figure 12 is a vertical section through one end of the bolster showing all the wedge members in side elevation and illustrating one of the bolts for securing a side bearing in place.
Figure 13:
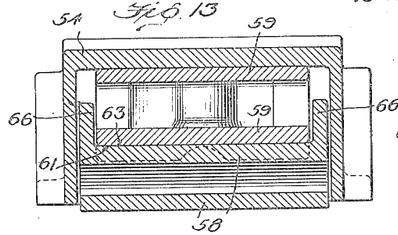
Figure 13 is a cross sectional view taken on the line 13—13 of Figure 12 looking in the direction of the arrows.
Figure 14:
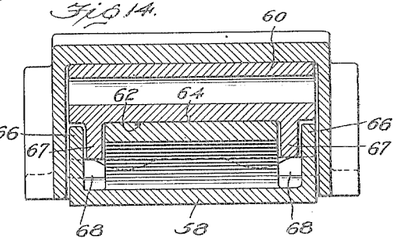
Figure 14 is a cross sectional view on the line 14—14 of Figure 12 looking toward the axis of the bolster.
Figure 15:
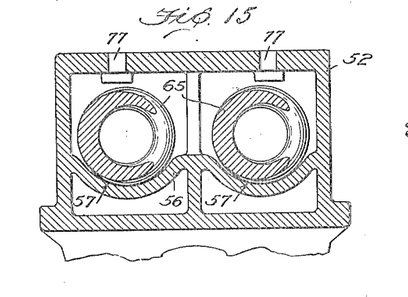
Figure 15 is a vertical cross sectional view taken on the line 15—15 of Figure 12 and looking in the same direction.

The inclined surfaces 61 and 62 of the lower wedge member 58 are shown as separated by a cut-out portion at the bottom of which is an upstanding wall 70 apertured to form a guide for a rivet 71 or other equivalent securing element which passes through the top of the bolster and which operates to hold all of the wedge members in proper assembled relation and with the spring or springs 65 compressed to any desired extent, during shipment or storage and during handling preliminary or subsequent to assembly. The bottom of the wedge member 58 is recessed at 72 to accommodate the head 73 of the rivet or other element during vertical movement of the bottom wedge member. In order that the horizontal or longitudinal movement of the upper wedge members 59 and 60 may not be interfered with by the member 71, the inner and outer edges, respectively, thereof are notched or cut away as indicated at 74 and 75. Clearly, the lower inner edge of the wedge member 59 must be recessed or notched out as indicated at 76 to accommodate the upstanding guide portion 70 when the bottom wedge member 58 moves upwardly and the upper wedge members move inwardly. It is conceivable that the surfaces of this guide portion and notch will coact to define stop means in case the absorption mechanism comprised by the wedge members and springs should go solid. As a mere manufacturing detail all the wedge members are or may be of hollow construction or cored-out to save material and reduce the weight of the parts.

This form of the invention in particular contemplates the provision of a convenient means for effecting mounting of the side bearings upon the bolster. The side bearings themselves are not shown as they form no part of the present invention and can be any of the ordinary or preferred types as well as a special type if such should be found necessary. To effect mounting of the side bearings, the end portions of the top wall of the bolster are shown as formed with holes 77 through which may be inserted bolts 78 adapted to pass through the attaching portion of whatever side bearing is used and carrying nuts 79. Access may be readily had to the interior of the bolster at the open bottom thereof prior to the insertion of the wedge members and springs and the bolts are inserted upwardly through these holes with their heads located within the bolster and against the undersurface of the top thereof. It is also intended to make use of other bolts, not shown, which could not be applied in this manner and for this reason the top of the bolster is shown as formed, adjacent the web or partition 55, with a rectangular opening 79ª leading into a slot 80, the former being of a size to accommodate the head of the bolt and the latter of proper dimensions to receive the shank, it being clear that the bolt is inserted head first and downwardly from the top of the bolster and then moved to cause it to engage within the slot 80. The wall or partition 55 is sufficiently close to the head of the bolt, when the latter is in its final position, to prevent turning when the side bearing is placed in position and the securing nut screwed home.

In the operation of all forms of the device, it will be seen that the spring or cushioning means within the bolster is in series with whatever truck springs are provided to support the bolster and owing to the interposition of the co-acting wedge elements it is clear that the periodicity of the springs will be different and synchronism avoided. The mere provision of these auxiliary springs in the bolster will act to increase the spring capacity of the car. Whenever there is any increased pressure on the truck springs resulting from an added load or from a tendency of the car body to roll or sway, the bottom wedge member in every instance will move upwardly into the pocket in the bolster, the inclined surface or surfaces coacting with the inclined surface or surfaces of the upper wedge member or members for forcing the latter inwardly against the resistance of the springs within the bolster. The friction developed during this action will of course retard any movement and consequently check any tendency of the car to develop a roll or side sway. The action is entirely automatic and continuous while the car is in service or travelling.

Referring specifically to Figures 4, 9, 10, 11, 12, 13 and 14, it will be noted that certain provision has been made for accommodating loads in excess of the friction capacity of the absorbing mechanism. It will be noted that under vertical movement of the wedge, which reacts upon the coil springs, the top wedge has corresponding movement toward the center of the bolster. With maximum vertical movement of the lower wedge, the upper wedge has maximum inward movement, so that as the lower wedge travels its maximum amount, the provided faces of this wedge coact with the corresponding faces of the upper wedge. Under these conditions, the upper wedge has moved inward its maximum amount, and the reactions upon the bolster are nearer the center than on existing bolsters. This feature reduces the bending moment in the bolster, which can be made correspondingly lighter in weight, to function as a beam.

In all instances it will be observed that the coacting wedge members will act to take an over-solid blow as the upper wedge member, if only one is used, and the outermost upper one, if a plurality is used, will strike against the underside of the top of the bolster and as in some forms of the invention the coacting cut-out portions and shoulders will engage. This action will cushion the over-solid blows now occurring on the existing spring elements in bolsters. Of course, the shock absorbing mechanism will act to prolong the life of the truck parts as well as the track rails as the ordinarily present excessive shocks and jars cannot occur. It is really believed that the construction, operation and advantages will be readily apparent to one skilled in the art without further explanation.

While I have shown and described preferred embodiments of the invention it should be understood that they are merely illustrative of the principles involved as I reserve the right to make all such changes and modifications in so far as details are concerned to increase the adaptability and widen the field of utility of the device provided such variations constitute no departure from the spirit of the invention or the scope of the claims hereunto appended.

Having thus described the invention, I claim:

1. In a railway truck bolster, a vertically movable wedge member within each end thereof adapted to seat upon the truck springs, a wedge member above and coacting with said first named wedge member and movable thereby, spring means opposing movement of said second named wedge member, and coacting means on said wedge members acting as stops.

2. In a railway truck bolster, a vertically movable wedge member within each end thereof adapted to seat upon the truck springs, a horizontally movable wedge member above and coacting with said first named wedge member, spring means opposing movement of the second named wedge member, and means connecting the first named wedge member with the bolster for preventing separation, said means being fixed with respect to the bolster and slidable with respect to the first named wedge member, the second named wedge member being slotted to accommodate said means.

3. In a railway truck bolster, a vertically movable wedge member within each end thereof adapted to seat upon the truck springs, a horizontally movable wedge member above and coacting with said first named wedge member, spring means opposing movement of the second named wedge member, and means connecting the first named wedge member with the bolster for preventing separation, said means comprising a securing member extending through the bolster and the first named wedge member, the first named wedge member being slidable with respect to said securing element, the second named wedge member having a longitudinal slot therein accommodating said securing element whereby to be movable without interference therewith.

4. In a railway truck bolster, a vertically movable wedge member within each end thereof adapted to seat upon the truck springs, a second wedge member located above and coacting with said wedge member, spring means opposing movement of the second named wedge member, and coacting shoulders on the wedge members adapted to engage and act as stops for limiting the movement thereof.

5. In a railway truck bolster, a vertically movable wedge member within each end thereof, a horizontally movable wedge member within the bolster coacting with the first named wedge member, spring means opposing movement of the second named wedge member, and coacting means on the wedge members limiting relative movement thereof for avoiding over-compression of said spring means.

6. In a railway truck bolster, a vertically movable wedge member in each end thereof, horizontally movable wedge members located above and coacting with each of said first named wedge members, spring members located within the bolster in engagement with the second named wedge members for opposing movement thereof in one direction, and means located beneath said spring members for supporting the same.

7. In a railway truck bolster, a vertically movable wedge member in each end thereof, horizontally movable wedge members located above and coacting with each of said wedge members, spring members located within the bolster in engagement with the second named wedge members for opposing movement thereof in one direction, and means located beneath said spring members for supporting the same, comprising seat members formed integrally upon the bottom portion of the bolster.

8. A railway truck bolster provided at each end with a vertically movable wedge member adapted to seat upon the truck springs, horizontally movable wedge members located within the bolster and coacting with each of said wedge members, and helical springs located within the bolster and engaging against the second named wedge members for urging the same in one direction, the bolster being provided internally with a transverse wall portion defining a pocket for the accommodation of the wedge members and springs, and the bolster being formed interiorly with integral seat portions engaging beneath the springs for maintaining them in proper position.

9. In a railway truck bolster, having at each end thereof, a vertically movable wedge reacting vertically upon the truck springs and horizontally and vertically upon a coacting upper wedge, the horizontal reaction upon the upper wedge forcing said upper wedges nearer each other whereby the reaction points of progressively increasing loads will be at progressively decreasing distances from the center.

10. In a railway truck bolster, provided at each end with a vertically movable wedge member adapted to seat upon the truck springs, a coacting horizontally movable upper wedge reacting against the under face of the top of the bolster, said reaction falling progressively nearer the center of the bolster as increasing loads are applied to the aforementioned wedge.

11. In a railway truck bolster having supporting springs beneath its ends, means seating upon said springs, cushioned means within the bolster reacting with said means, both of said means being formed to shift the reaction points toward the center of the bolster under progressively increasing loads.

12. In a railway car truck, a bolster, supporting springs therefor, and coacting means operating in series with the truck springs for shifting the reaction points of the load toward the center of the bolster under progressively increasing load conditions.

13. In a railway truck bolster, a vertically movable wedge within each end thereof seating upon the truck springs, other wedge members within the bolster movable longitudinally thereof and coacting with the first named wedge members, spring means urging the second named wedge members outwardly, said wedge members having embracingly engaging portions thereon.

14. A railway truck bolster having at each end thereof a vertically movable wedge member adapted to seat upon the truck springs, a horizontally movable spring pressed wedge member cooperating with the first named wedge member located within the bolster, one of said wedge members having portions thereon extending laterally beyond and embracing the other.

In testimony whereof I affix my signature.

THOMAS H. SYMINGTON.